(12) United States Patent
Beati et al.

(10) Patent No.: US 7,804,930 B2
(45) Date of Patent: Sep. 28, 2010

(54) NUCLEAR FUEL ASSEMBLY COMPRISING A REINFORCING MESH DEVICE AND THE USE OF ONE SUCH DEVICE IN A NUCLEAR FUEL ASSEMBLY

(75) Inventors: Angelo Beati, Lyons (FR); Thierry Muller, Ste Helene (FR); Jean-François Rondemerre, Lyons (FR)

(73) Assignee: Areva NP, Courbevoie (FR)

( * ) Notice: Subject to any disclaimer, the term of this patent is extended or adjusted under 35 U.S.C. 154(b) by 0 days.

(21) Appl. No.: 10/574,258

(22) PCT Filed: Sep. 22, 2004

(86) PCT No.: PCT/FR2004/002388

§ 371 (c)(1),
(2), (4) Date: Mar. 28, 2006

(87) PCT Pub. No.: WO2005/034136

PCT Pub. Date: Apr. 14, 2005

(65) Prior Publication Data

US 2007/0076840 A1 Apr. 5, 2007

(30) Foreign Application Priority Data

Sep. 30, 2003 (FR) .................................. 03 11459

(51) Int. Cl.
*G21C 3/34* (2006.01)
(52) U.S. Cl. ..................... 376/438; 376/434; 376/426
(58) Field of Classification Search ................. 376/438, 376/434, 426, 433, 409
See application file for complete search history.

(56) References Cited

U.S. PATENT DOCUMENTS

| 4,416,852 A | * | 11/1983 | Nylund | 376/438 |
| 4,576,786 A | * | 3/1986 | DeMario | 376/439 |
| 4,659,543 A | * | 4/1987 | Lui | 376/444 |
| 4,678,625 A | * | 7/1987 | Wilson et al. | 376/261 |
| 4,859,408 A | * | 8/1989 | Kerrey | 376/450 |
| 5,118,467 A | * | 6/1992 | Lippert et al. | 376/434 |
| 5,183,629 A | * | 2/1993 | Canat et al. | 376/439 |
| 5,227,130 A | * | 7/1993 | Nylund | 376/438 |
| 5,230,858 A | * | 7/1993 | Matzner et al. | 376/282 |

(Continued)

FOREIGN PATENT DOCUMENTS

EP 0 261 544 3/1988

(Continued)

OTHER PUBLICATIONS

Merriam-Webster's Collegiate Dictionary, tenth edition, 1993, p. 64.*

(Continued)

*Primary Examiner*—Rick Palabrica
(74) *Attorney, Agent, or Firm*—Davidson, Davidson & Kappel

(57) ABSTRACT

The nuclear fuel assembly having nuclear fuel rods and a support skeleton having two nozzles, guide tubes interconnecting the nozzles, and spacer grids for holding the rods, the grids being secured to the guide tubes. The assembly further has at least one lattice reinforcing device for reinforcing the support skeleton. The reinforcing device is placed between two spacer grids and is secured to the guide tubes. The invention is applicable to fuel assemblies for pressurized water reactors.

15 Claims, 5 Drawing Sheets

U.S. PATENT DOCUMENTS 5,263,072 A * 11/1993 Canat et al. .................. 376/439
5,625,657 A * 4/1997 Gallacher ................... 376/261
6,400,788 B1 * 6/2002 Hirano et al. ............... 376/438
6,744,842 B2 * 6/2004 Schmidt et al. ............. 376/434

FOREIGN PATENT DOCUMENTS

EP  0 516 542  12/1992
FR  2 665 291  1/1992
SE  20010003730  * 11/2001

OTHER PUBLICATIONS

"Fuel cartridge, for PWR reactor, has reinforcing part extending between support plates", Derwent, Nov. 9, 2001 XP002284687.
Patent Abstracts of Japan, vol. 0174, No. 61 (P-1598) (Aug. 23, 1993), & JP 05 107377 (Apr. 27, 1993).

* cited by examiner

NUCLEAR FUEL ASSEMBLY COMPRISING A REINFORCING MESH DEVICE AND THE USE OF ONE SUCH DEVICE IN A NUCLEAR FUEL ASSEMBLY

FIELD OF THE INVENTION

The present invention relates to nuclear fuel assemblies. By way of example, it applies to fuel assemblies for pressurized water nuclear reactors.

BACKGROUND OF THE INVENTION

Generally, nuclear fuel assemblies comprise nuclear fuel rods and a support skeleton having two nozzles, guide tubes interconnecting the nozzles, and spacer grids for holding the rods.

Each spacer grid comprises two sets of crossed plates and an outer belt, thus defining cells, some of which have guide tubes passing through them and others have fuel rods passing through them. The plates are provided with means for holding the rods at the nodes of a substantially regular array and they are secured to at least some of the guide tubes.

At least one of the spacer grids also serves to support the rods. For this purpose, it is usually provided with springs that are cut out in the plates or that are fitted to the plates, and that serve to press the rods against dimples stamped in the plates and forming the opposite faces of the cells.

The other grids serve only to hold the rods at the nodes of the array. To do this, they present dimples on each of the faces of a cell having a rod passing therethrough, the dimples serving to press against the rod.

French patent No. 2 665 291 also discloses additional mixer grids for interposing between the spacer grids and having fins for improving the mixing of the cooling fluid flowing through the assemblies.

Once manufactured, such assemblies extend rectilinearly and vertically along a direction that is referred to as being "axial". Once in place in a reactor, these assemblies deform because of the irradiation and can take on C-shapes, S-shapes, or W-shapes.

Such deformations lead to numerous problems. In operation, they make it more difficult to insert control and shutdown clusters into the guide tubes.

During handling, these deformations increase the risk of assemblies catching on one another, e.g. during operations of loading or unloading the core of the reactor.

SUMMARY

An object of the invention is to solve this problem by limiting the deformation of nuclear fuel assemblies under irradiation.

To this end, the invention provides a nuclear fuel assembly of the type comprising nuclear fuel rods and a supporting skeleton having two nozzles, guide tubes interconnecting the nozzles, and spacer grids for holding the rods, which grids are secured to the guide tubes, the assembly being characterized in that it further comprises at least one lattice reinforcing device for reinforcing the support skeleton, the lattice reinforcing device being disposed between two spacer grids and being secured to the guide tubes.

In particular embodiments, the assembly may further comprise one or more of the following characteristics taken singly or in any technically feasible combination:

the nuclear fuel rods are disposed in a substantially regular array and the lattice reinforcing device does not extend between the peripheral rods;

the lattice reinforcing device does not extend between the peripheral layer of rods and the adjacent layer of rods;

the lattice reinforcing device does not have means for mixing a cooling fluid that is to flow through the nuclear fuel assembly;

the lattice reinforcing device does not have an arrangement for holding nuclear fuel rods;

the lattice reinforcing device comprises two sets of crossed plates that are secured to one another, the plates defining between them cells for receiving guide tubes and cells for receiving nuclear fuel rods; and the cells for receiving nuclear fuel rods are of dimensions greater than the dimensions of the rods so as to receive them with clearance.

The invention also provides the use of a nuclear fuel assembly comprising nuclear fuel rods and a support skeleton, the assembly having:

two nozzles;
guide tubes interconnecting the nozzles; and
spacer grids for holding the rods;

at least one lattice reinforcing device for reinforcing the support skeleton, the lattice reinforcing device being disposed between two spacer grids and being secured to the guide tubes.

In particular implementations:

the lattice reinforcing device does not have an arrangement for mixing a cooling fluid that is to flow through the nuclear fuel assembly;

the lattice reinforcing device does not have an arrangement for holding nuclear fuel rods;

the lattice reinforcing device comprises two sets of crossed plates that are secured to one another, the plates defining between them cells for receiving guide tubes and cells for receiving nuclear fuel rods; and the cells for receiving nuclear fuel rods are of dimensions greater than those of the rods, so as to receive them with clearance.

BRIEF DESCRIPTION OF THE DRAWINGS

The invention can be better understood on reading the following description given purely by way of example and made with reference to the accompanying drawings, in which.

DETAILED DESCRIPTION

Figure 1:
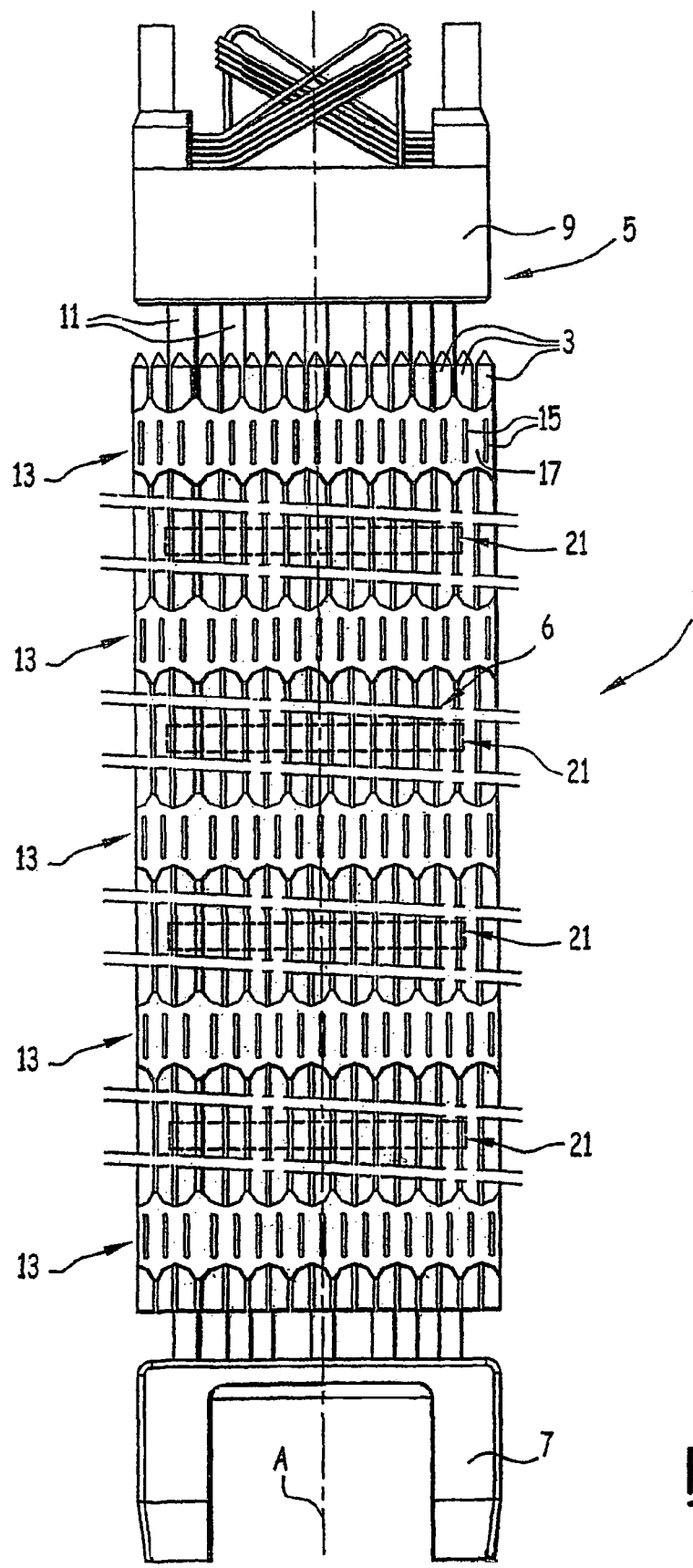
FIG. 1 is a diagrammatic elevation view of a nuclear fuel assembly of the invention.

FIG. 1 is a diagram of a nuclear fuel assembly 1 for a pressurized water reactor. The assembly 1 extends vertically and in rectilinear manner along a longitudinal direction A.

The assembly 1 mainly comprises nuclear fuel rods 3 and a structure or skeleton 5 for supporting the rods 3.

Figure 3:
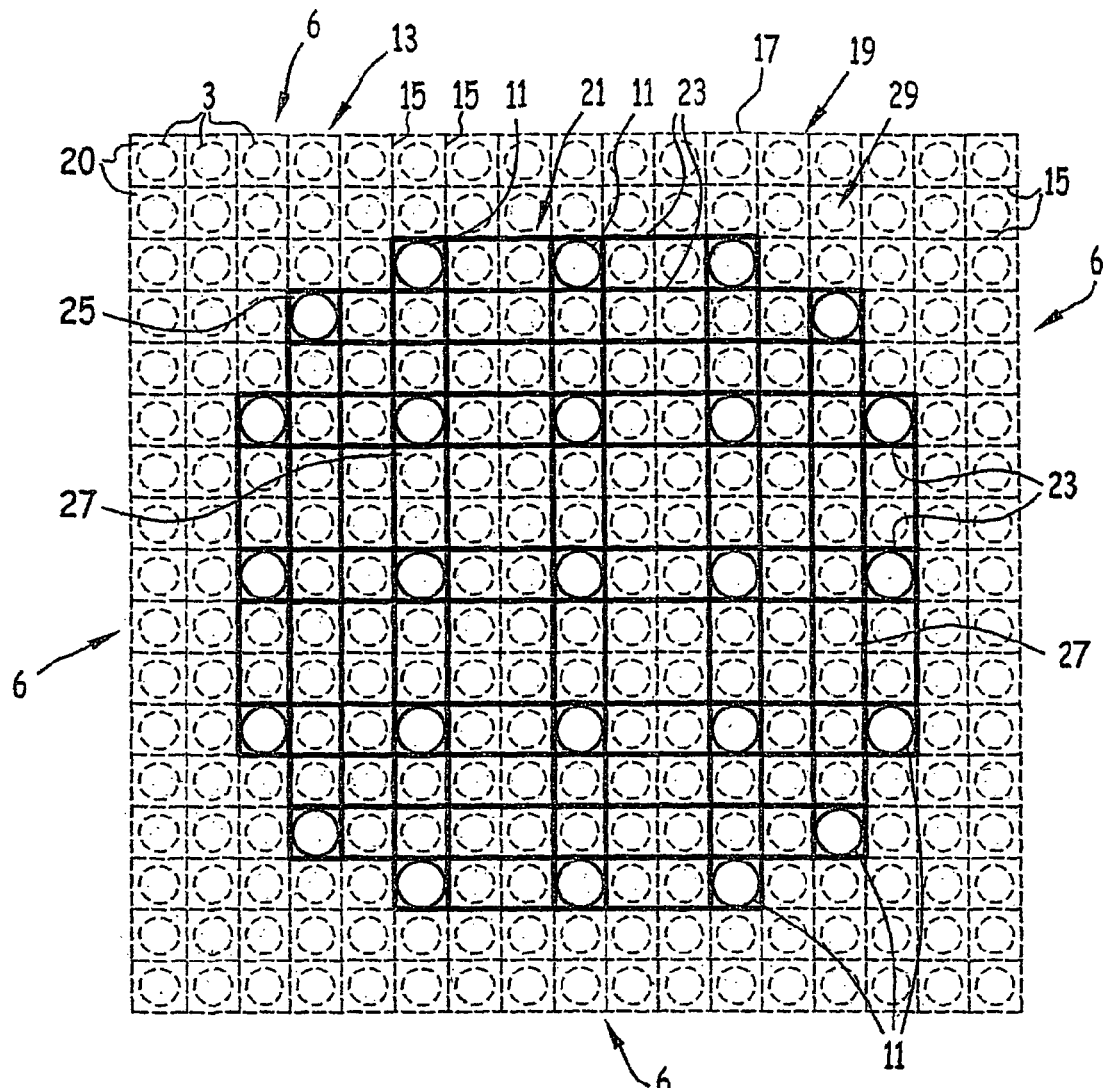
FIG. 3 is a diagrammatic plan view comparing the structure and the extent of the intermediate reinforcing device of FIG. 2 relative to the array of nuclear fuel rods and to a holding grid of the FIG. 1 assembly.

In conventional manner, the rods 3 extend vertically and are disposed in a substantially regular, square-based array, as can be seen in FIG. 3 where the rods 3 are shown in dashed lines.

In the example shown, the assembly 1 comprises a group of 264 rods 3 and, seen from above, the array forms a square having a side of 17 rods. The group of rods 3 thus possesses four side faces 6 each having 17 rods.

The supporting skeleton 5 essentially comprises:
a bottom nozzle 7 and a top nozzle 9;
guide tubes 11 for receiving the rods of a control or shutdown cluster; and
spacer grids 13 for holding the rods 3 at the nodes of the array.

The nozzles 7 and 9 are secured to the longitudinal ends of the guide tubes 11.

As can be seen in FIG. 3, in which a spacer grid 13 is drawn in dashed lines, each spacer grid 13 comprises, for example, two sets of crossed plates 15 and a peripheral belt 17 surrounding the peripheral layer 19 of rods 3. The grid 13 defines cells 20, most of which receive a respective rod 3. Bosses (not shown) are provided in the plates 15 to press against the rods 3 and hold them at the nodes of the array. Each of the other cells 20 receives a guide tube 11.

Also in conventional manner, the spacer grids 13 are secured to the guide tubes 11 and are distributed along the height of the rods 3.

The rods 3 can be held axially by a single spacer grid 13, e.g. the top gird 13, which is then provided for this purpose with springs for thrusting the rods 3 against dimples cut out in the plates 15 or fitted thereto.

In the invention, between the spacer grid 13, the assembly 1 includes intermediate devices 21 for reinforcing the skeleton 5.

For reasons explained below, these reinforcing devices 21 are not visible from outside the assembly 1, and they are therefore shown in dashed lines in FIG. 1.

In the example shown, an intermediate reinforcing device 21 is provided between each pair of spacer grids 13.

Figure 2:
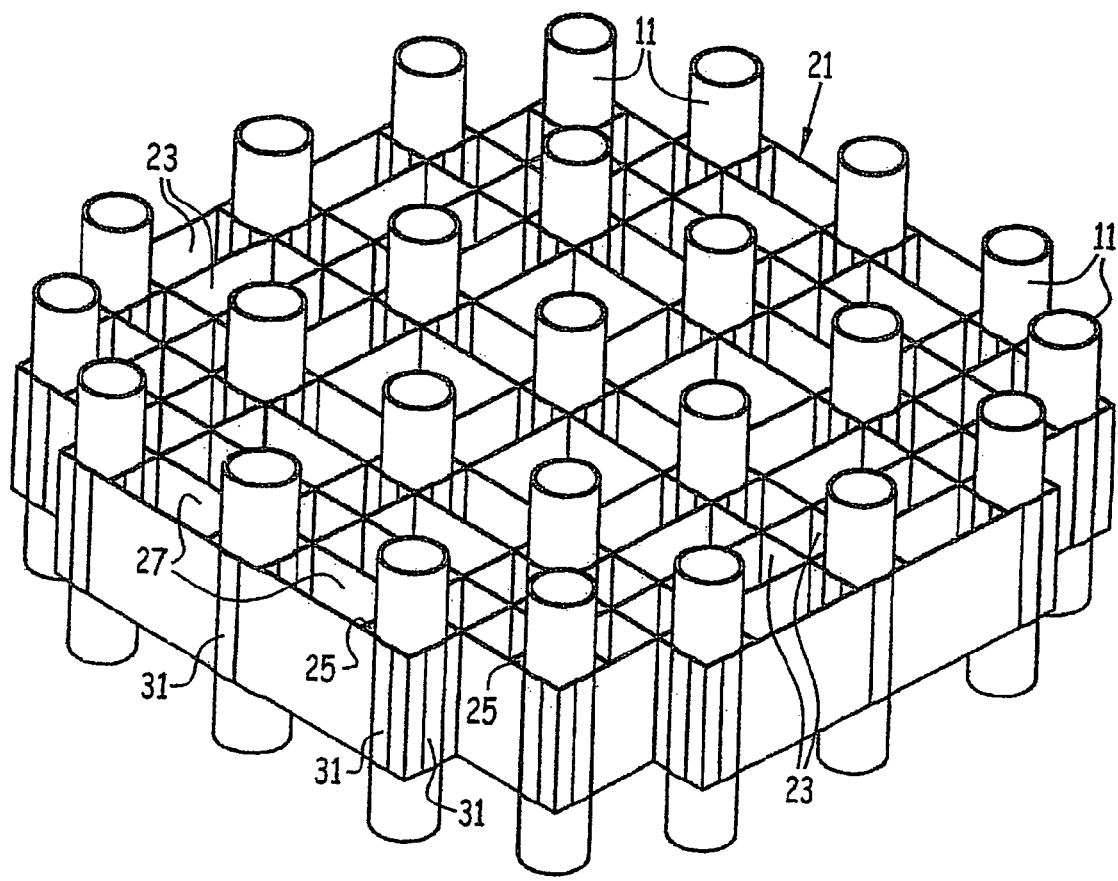
FIG. 2 is a fragmentary diagrammatic view in perspective showing an intermediate reinforcing device of the FIG. 1 assembly.

Since the structure of the intermediate reinforcing devices 21 is similar, only one device 21 is described with reference to FIGS. 2 and 3. It should be observed that only segments of the guide tubes 11 are shown in FIG. 2. In FIG. 3, the guide tubes 11 and the intermediate reinforcing device 21 are drawn in continuous lines.

The device 21 comprises two sets of crossed plates 23 that are secured to one another, e.g. by welding at their points of intersection. By way of example, the plates 23 are about 0.425 millimeters (mm) thick and of a height lying in the range about 18 mm to about 28 mm. They are preferably made of zirconium alloy.

Between them, the plates 23 define cells 25, each for receiving a respective guide tube 11, and cells 27 for receiving the rods 3. As can be seen in FIG. 3, some of the cells 27 are individual cells that receive only one rod 3, whereas others receive two or four rods 3.

The plates 23 of the intermediate reinforcing device 21 form a lattice structure extending solely between the guide tubes 11. This lattice structure thus forms an openwork structure.

Thus, the transverse extent of the plates 23, and thus of the reinforcing device 21, is limited. In particular, the plates 23 do not extend between the rods 3 of the outer peripheral layer 19 of rods 3, nor between said layer 19 and the intermediately adjacent layer 29 which, in the example shown, comprises 15 rods per side. The intermediate reinforcing device 21 stops in the vicinity of this layer 29.

The plates 23 do not have any arrangement for holding the rods 3, and as a result the cells 27 are of dimensions that are greater than the dimensions of the rods 3, thereby surrounding them with clearance.

Furthermore, the intermediate reinforcing device 21 has no arrangement for mixing cooling fluid flowing through the fuel assembly 1, e.g. no fins.

The intermediate reinforcing device 21 is secured to the guide tubes 11, e.g. by welding in slightly bulging zones 31 (FIG. 2) of the plates 23. Such welding may be applied to the tops and/or the bottoms of the plates 23.

Figure 4:
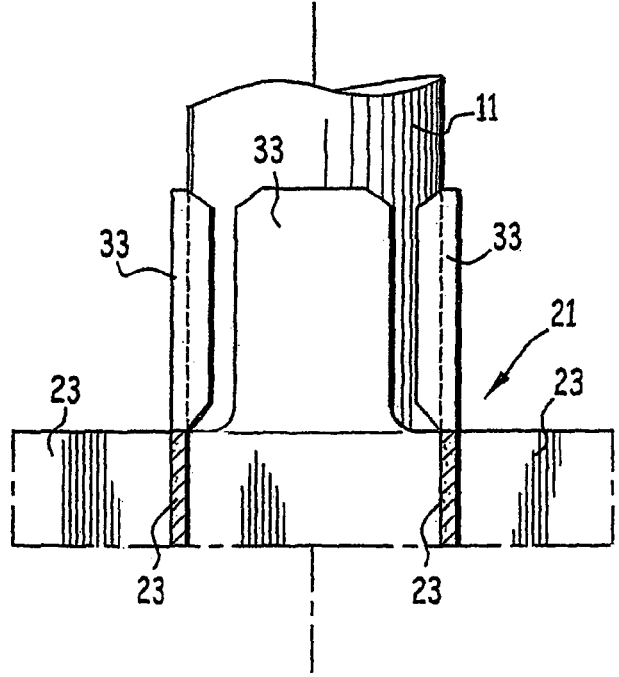
FIG. 4 is a fragmentary diagrammatic view in section showing the connection with the guide tubes in a variant of the intermediate reinforcing device of FIG. 2.

In a variant shown in FIG. 4, the plates 23 may be welded to the guide tubes 11 via welding tabs 33 which project from the plates 23, e.g. upwards.

If the assembly 1 includes an instrumentation tube instead of the central guide tube 11, then the intermediate reinforcing devices 21 can be welded thereto.

Because of the presence of the intermediate reinforcing devices 21, both the skeleton of the support 5 and thus the entire assembly 1 are more rigid.

Figure 5:
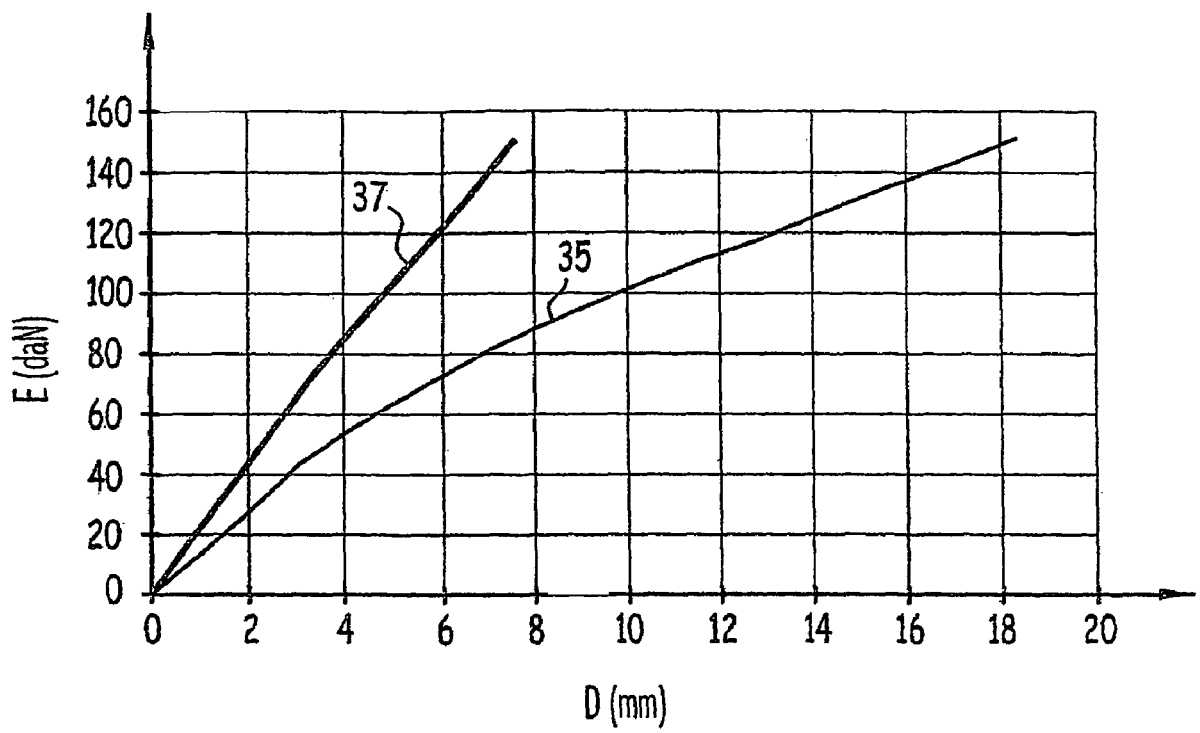
FIG. 5 is a graph comparing the rigidity of a conventional assembly and the assembly of FIG. 1, prior to irradiation.

This is confirmed by FIG. 5 which shows the result of simulations of lateral deformations to nuclear fuel assemblies before irradiation. In this figure lateral displacement D in mm is plotted along the abscissa and the force E in daN necessary for obtaining this deformation is plotted up the ordinate.

Curve 35 corresponds to a prior art assembly immediately after manufacture, i.e. prior to irradiation. Curve 37 corresponds to the assembly 1 of FIG. 1 immediately after manufacture. Thus, the presence of the intermediate reinforcing devices 21 enables the stiffness or lateral rigidity of the assembly 1 to be increased by about 60% at the beginning of its lifetime compared with a conventional assembly.

Figure 6:
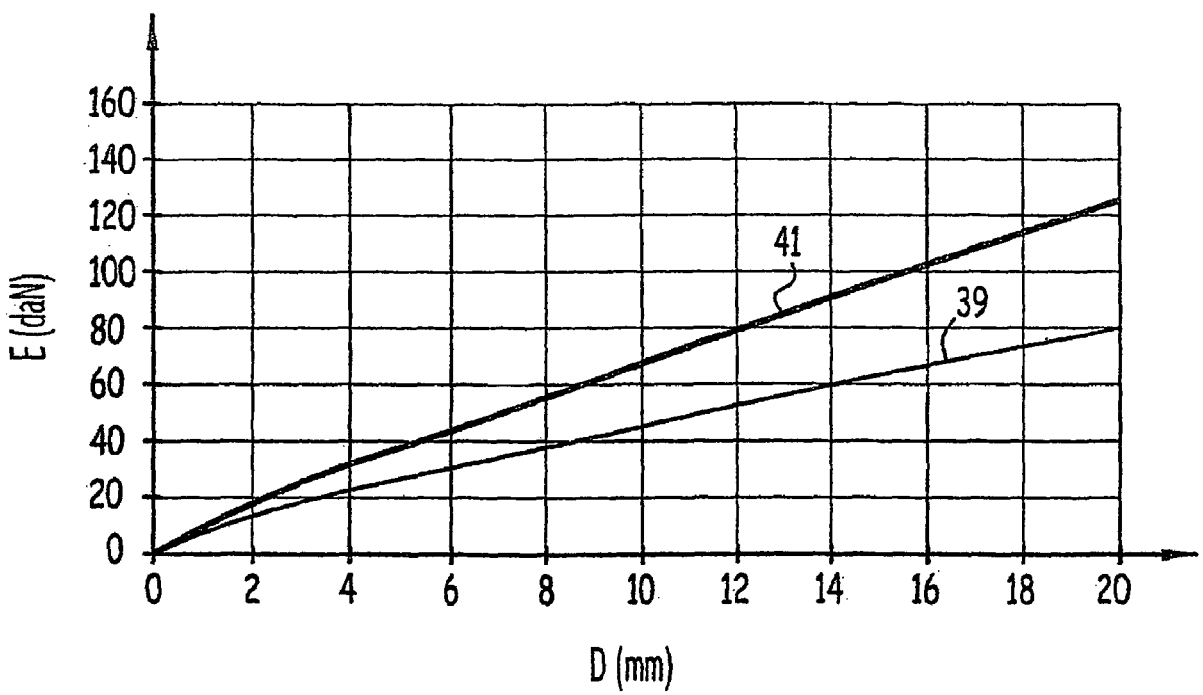
FIG. 6 is a view analogous to FIG. 5, after irradiation.

FIG. 6 corresponds to analogous simulations performed after irradiation. Curve 39 corresponds to a conventional assembly and curve 41 to the assembly 1 of FIG. 1. The increase in the lateral rigidity of the assembly 1 thus remains after irradiation, with this increase continuing to be about 60%.

Thus, the assembly 1 presents stiffness at the end of its lifetime equivalent to that of a conventional assembly at the beginning of its lifetime. The use of intermediate reinforcing devices 21 for reinforcing the support skeleton 5 makes it possible to compensate for the effect of irradiation.

It has been found that the reduction in rigidity of conventional assemblies after irradiation is due to the guide tubes creeping and to changes to the conditions whereby rods 3 are held by the skeleton 5, such that the rods 3 contribute about 65% of the rigidity of an assembly prior to irradiation but contribute no more than about 40% of the stiffness after irradiation.

The stiffening of the skeleton 5 by the intermediate reinforcing devices 21 thus makes it possible to increase the lateral stiffness thereof, including after irradiation. As a result the openwork structure of the reinforcing devices 21, which are also of small transverse extent, ensures that head losses in the cooling fluid remain limited.

Figure 7:
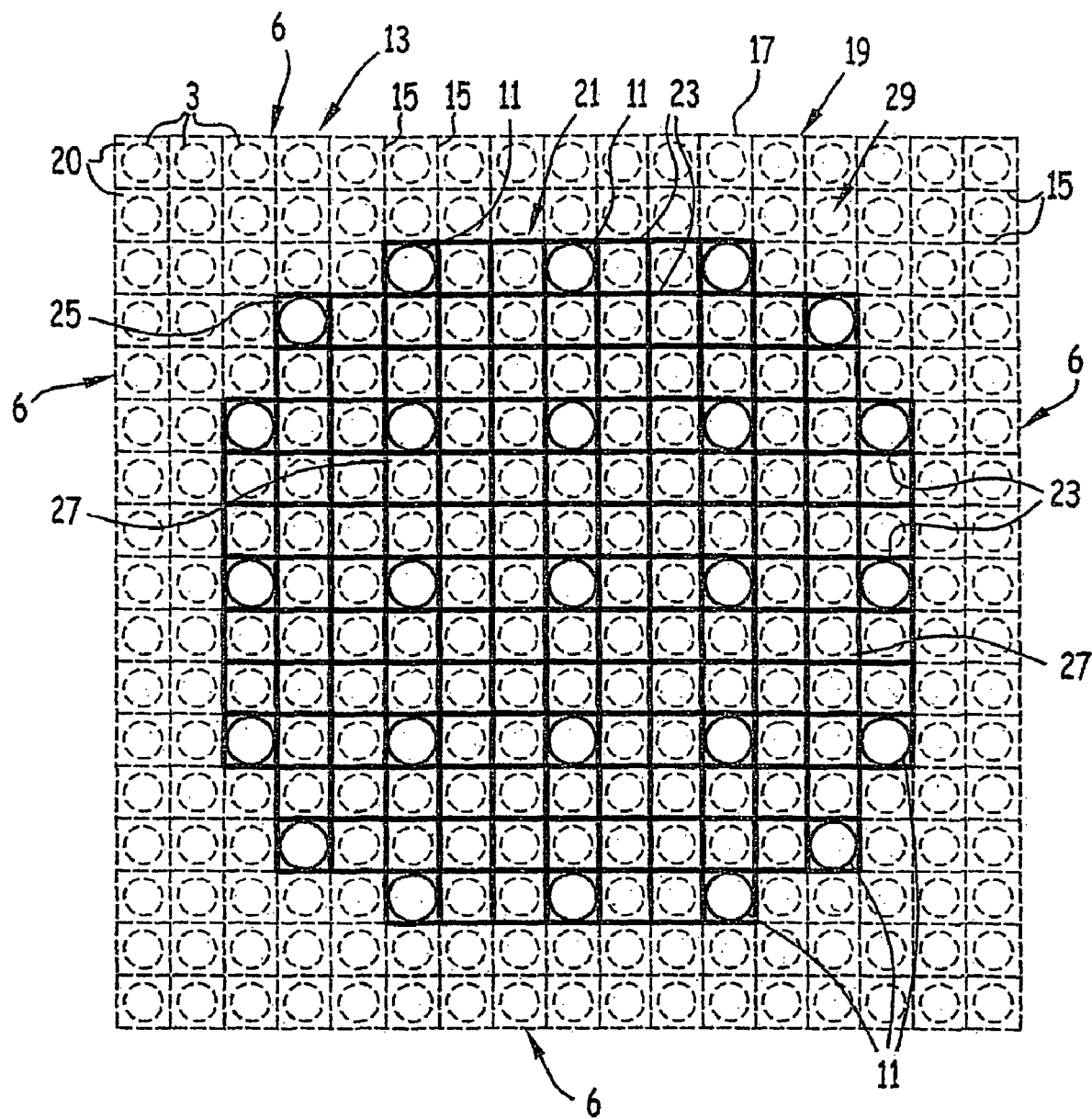
FIG. 7 is a view analogous to FIG. 3 showing a variant of the intermediate reinforcing device of FIG. 2.

In the variant shown in FIG. 7, the reinforcing device 21 may be constituted by a lattice structure that is more dense such that all of the cells 27 are individual cells each receiving no more than a single rod 3.

This variant makes it possible to further increase the lateral rigidity of the assembly 1 but also increases head loss in the cooling fluid passing through the assembly 1.

In yet another variant, the intermediate reinforcing device 21 can extend laterally beyond the guide tubes 11, possibly as far as the peripheral layer 19 of rods 3, and may also include an outer belt. Thus, the device 21 forms a lattice structure analogous to a spacer grid 13. The outer belt can improve the ability of the assembly 1 to withstand impacts during handling and under accident conditions. In the above-described example, the number of plates in the device 21 would then be 36.

More generally, the intermediate reinforcing devices 21 can be secured to the guide tubes by arrangement other than welding, e.g. by tube expansion, by sleeving, etc. . . .

Similarly, the assembly 1 need not include an intermediate reinforcing device 21 between each pair of spacer grids 13.

In certain variants, the intermediate reinforcing devices 21 may also have an arrangement for holding the rods 3 and/or an arrangement for mixing the cooling fluid flowing through the assembly.

Naturally, intermediate reinforcing devices 21 could be sold on their own.

The invention claimed is:

1. A PWR nuclear fuel assembly comprising:
nuclear fuel rods disposed in a substantially regular array, the array having a peripheral layer of fuel rods constituting a closed loop and an adjacent layer of fuel rods, the adjacent layer constituting a closed loop of fuel rods adjacent to and surrounded by the peripheral layer;
a supporting skeleton having two nozzles;
guide tubes for receiving control rods, said guide tubes interconnecting the nozzles; and
spacer grids for holding the fuel rods, wherein the grids are secured to the guide tubes, the assembly further comprising:
at least one lattice reinforcing device for reinforcing the support skeleton, the lattice reinforcing device comprising two sets of crossed plates that are secured to one another, the crossed plates defining between them cells for receiving guide tubes and cells for receiving nuclear fuel rods, the lattice reinforcing device having an upper end and a lower end disposed between two adjacent spacer grids,
wherein the lattice reinforcing device is directly secured to the guide tubes,
wherein the lattice reinforcing device does not extend between the fuel rods of the peripheral layer and between the fuel rods of the adjacent layer.

2. The assembly according to claim 1, wherein the lattice reinforcing device does not have an arrangement for mixing a cooling fluid that is to flow through the nuclear fuel assembly.

3. The assembly according to claim 1, wherein the lattice reinforcing device does not directly contact the nuclear fuel rods.

4. The assembly according to claim 3, wherein the cells for receiving nuclear fuel rods are of dimensions greater than dimensions of the fuel rods so as to receive the fuel rods with clearance.

5. A PWR nuclear fuel assembly comprising:
nuclear fuel rods;
a supporting skeleton having two nozzles;
guide tubes for receiving control rods, said guide tubes interconnecting the nozzles; and
spacer grids for holding the fuel rods, wherein the grids are secured to the guide tubes, the assembly further comprising:
at least one lattice reinforcing device for reinforcing the support skeleton, the lattice reinforcing device comprising two sets of crossed plates that are secured to one another, the crossed plates defining between them cells for receiving guide tubes and cells for receiving nuclear fuel rods, the lattice reinforcing device having an upper end and a lower end disposed between two adjacent spacer grids,
wherein the lattice reinforcing device is directly secured to the guide tubes,
wherein the lattice reinforcing device does not have an arrangement for mixing a cooling fluid that is to flow through the nuclear fuel assembly, and wherein the lattice reinforcing device does not directly contact the nuclear fuel rods.

6. The assembly according to claim 5, wherein the nuclear fuel rods are disposed in a substantially regular array, the array having a peripheral layer of fuel rods constituting a closed loop, and wherein the lattice reinforcing device does not extend between the fuel rods of the peripheral layer.

7. The assembly according to claim 6, wherein the array has a layer of fuel rods adjacent to the peripheral layer, the adjacent layer constituting a closed loop of fuel rods adjacent to and surrounded by the peripheral layer, and wherein the lattice reinforcing device does not extend between the fuel rods of the peripheral layer and between the fuel rods of the adjacent layer.

8. The assembly according to claim 5, wherein
the cells for receiving nuclear fuel rods are of dimensions greater than dimensions of the fuel rods so as to receive the fuel rods with clearance.

9. A PWR nuclear fuel assembly comprising:
nuclear fuel rods disposed in a substantially regular array, the array having a peripheral layer of fuel rods constituting a closed loop;
a supporting skeleton having two nozzles;
guide tubes for receiving control rods, said guide tubes interconnecting the nozzles; and
spacer grids for holding the fuel rods, wherein the grids are secured to the guide tubes, the assembly further comprising:
at least one lattice reinforcing device for reinforcing the support skeleton, the lattice reinforcing device comprising two sets of crossed plates that are secured to one another, the crossed plates defining between them cells for receiving guide tubes and cells for receiving nuclear fuel rods, the lattice reinforcing device having an upper end and a lower end disposed between two adjacent spacer grids,
wherein the lattice reinforcing device is being directly secured to the guide tubes,
wherein the lattice reinforcing device does not extend between the fuel rods of the peripheral layer, and wherein the lattice reinforcing device does not directly contact the nuclear fuel rods.

10. The assembly according to claim 9, wherein the array has a layer of fuel rods adjacent to the peripheral layer, the adjacent layer constituting a closed loop of fuel rods adjacent to and surrounded by the peripheral layer, and wherein the lattice reinforcing device does not extend between the fuel rods of the peripheral layer and between the fuel rods of the adjacent layer.

11. The assembly according to claim 9, wherein the lattice reinforcing device does not have an arrangement for mixing a cooling fluid that is to flow through the nuclear fuel assembly.

12. The assembly according to claim 9, wherein
the cells for receiving nuclear fuel rods are of dimensions greater than dimensions of the fuel rods so as to receive the fuel rods with clearance.

13. The assembly according to claim 1 wherein the lattice reinforcing device is directly secured to the guide tubes by welding.

14. A method for making an assembly according to claim 1 comprising directly securing the lattice reinforcing device to the guide tubes by tube expansion.

15. A method for making an assembly according to claim 1 comprising directly securing the lattice reinforcing device to the guide tubes by sleeving.

* * * * *